(12) United States Patent
Berman

(10) Patent No.: US 6,525,329 B1
(45) Date of Patent: Feb. 25, 2003

(54) METHOD AND DEVICE FOR DETECTING CURRENCY

(76) Inventor: David Berman, 362 St. Marks Pl., Staten Island, NY (US) 10301

( * ) Notice: Subject to any disclaimer, the term of this patent is extended or adjusted under 35 U.S.C. 154(b) by 34 days.

(21) Appl. No.: 09/678,221

(22) Filed: Oct. 1, 2000

(51) Int. Cl.[7] .................................................. G06K 5/00
(52) U.S. Cl. ......................................... 250/556; 356/71
(58) Field of Search ................................ 250/556, 221, 250/222.1; 356/71, 448; 324/326–329, 67; 73/163, 865.8

(56) References Cited

U.S. PATENT DOCUMENTS

| | | | | |
|---|---|---|---|---|
| 5,406,259 A | * | 4/1995 | Manneschi | 340/561 |
| 5,661,552 A | * | 8/1997 | Nishigai | 356/71 |
| 5,786,696 A | * | 7/1998 | Weaver et al. | 324/329 |
| 6,026,175 A | * | 2/2000 | Munro et al. | 382/135 |
| 6,211,662 B1 | * | 4/2001 | Bijawat et al. | 324/67 |
| 6,259,241 B1 | * | 7/2001 | Krantz | 324/67 |
| 6,326,790 B1 | * | 12/2001 | Ott et al. | 324/327 |

* cited by examiner

*Primary Examiner*—Kevin Pyo
*Assistant Examiner*—Seung C. Sohn
(74) *Attorney, Agent, or Firm*—Michael I. Kroll

(57) ABSTRACT

The invention is a multi-sensor device which generates a signal comprised of one or more electromagnetic waveforms, that are transmitted against a first target material, such as a wall, whereupon said wave or portion thereof is reflected by a first surface and a second wave or portion of said first wave will penetrate the target material and be reflected in part by a second surface for the purpose of ascertaining if the cavity between said first target surface and said second target surface contains a quantity of United States currency.

3 Claims, 10 Drawing Sheets

METHOD AND DEVICE FOR DETECTING CURRENCY

FIELD OF THE INVENTION

The present invention relates generally to surface penetrating object detection and, more specifically, to a multi-sensor module for detecting quantities of United States currency secreted from view within sealed containers or concealed from view by placement in cavities within floors, ceilings, or walls.

The multi-sensor device is a handheld portable device comprised of a housing having electronic circuits for selectively transmitting variable wavelength electromagnetic waves and electronic circuits for receiving electromagnetic waves.

Further said device has electronic storage means for maintaining a database of known responses for a plurality of predetermined electromagnetic wavelengths and a plurality of target materials and known responses for objects contained within or behind said plurality of target materials.

In addition said device has electronic circuits including microprocessor, memory, antenna, filters and power supply for receiving, analyzing, recording and comparing returning electromagnetic waveforms to said database. Said device further having means for generating visual and/or audible signals based on said analytical comparison.

DESCRIPTION OF THE PRIOR ART

There are other currency verification devices. Typical of these is U.S. Pat. No. 4,618,257 issued to Bayne et al. on Oct. 21, 1986.

Another patent was issued to Ishida on Aug. 20, 1985 as U.S. Pat. No. 4,536,709. Another patent was issued to Gorgone on Feb. 24, 1987 as U.S. Pat. No. 4,645,936. Yet another U.S. Pat. No. 4,973,851 was issued to Lee on Nov. 27, 1990. Another U.S. Pat. No. 5,358,088 was issued to Barnes et al. on Oct. 25, 1994 and yet another was issued on May 30, 1995 to Harbaugh as U.S. Pat. No. 5,419,424 and still yet another was issued on Jul. 18, 1995 to Crane et al. as U.S. Pat. No. 5,434,427.

Another patent was issued to Ebstein et al. on Nov. 21, 1995 as U.S. Pat. No. 5,468,971. Yet another U.S. Pat. No. 5,535,871 was issued to Harbaugh on Jul. 16, 1996. Another U.S. Pat. No. 5,761,089 was issued to McInerny on Jun. 2, 1998. Yet another U.S. Pat. No. 5,810,146 was issued to Harbaugh on Sep. 22, 1998 and another U.S. Pat. No. 5,892,239 was issued to Nagase on Apr. 6, 1999.

U.S. Pat. No. 4,618,257

Inventor: Robert T. Bayne et al.

Issued: Oct. 21, 1986

A color sensitive currency verifier operating with a plurality of narrowband light sourced optically coupled to a single broadband photodetector and including means for automatically balancing the color outputs of the various light sources. Color balancing is accomplished just prior to the examination of a specimen bill. The data samples are taken under the control of a microprocessor and used to authenticate the specimen bill both on the basis of pattern and color information stored in memory. Multiple data samples from a single target area are divided to compensate for soiling condition of the bill, and further compensation for condition of the bill is provided by adjusting the conversion scale factor of an A/D converter on the basis of data samples taken from a reference target area on the surface of the specimen bill before test or data samples are taken.

U.S. Pat. No. 4,536,709

Inventor: Tsuyoshi Ishida

Issued: Aug. 20, 1985

The metal detecting device includes first and second coils provided on both sides of a passageway for paper money. This metal detecting device is designed for use in detecting a metal strip embedded in the paper money in order to determine whether the paper money is genuine or counterfeit. The first coil is connected to a high frequency AC source to generate an AC magnetic field. The second coil is connected to a capacitor to form a resonance circuit which resonates at the same frequency as the AC current. The variation of the Q factor of the resonance circuit due to eddy-current losses produced in the metal strip of the paper money is used by a detecting circuit to determine whether the paper money passing through the space between the first and second coils is genuine.

U.S. Pat. No. 4,645,936

Inventor: Robert L. Gorgone

Issued: Feb. 24, 1987

A detection system for utilization with a paper security or currency validation apparatus wherein a correlation is made between reference patterns and cross hatch lines located in the portrait background on the paper and the preference of one of two paper currencies is determined. Fundamentally the invention consists of a single reticle which contains a lens whereon are located the cross hatch references for two different paper currency denominations. Within the reticle assembly are located two photosensitive cells, one for each reference pattern. Each photosensitive cell is connected to its own authenticating circuitry which validates the presence of a specific paper currency note. Should the tested paper pass the authenticity test of one authenticity circuitry, the other is disabled. Should the tested paper fail both authenticating tests, it is rejected.

U.S. Pat. No. 4,973,851

Inventor: Larry F. Lee

Issued: Nov. 27, 1990

An article of paper currency to be validated is scanned magnetically along the front to obtain a set of magnetic sample values and optically along the back to obtain a set of optical sample data values. Position-shifted versions of the magnetic data values are compared with stored sets of magnetic reference values for various denominations to obtain error figures for each denomination and degree of position shifting tested. A first indication of the denomination of the currency is generated on the basis of the least of the error figures so obtained. Position-shifted and amplitude-shifted versions of the optical data values are similarly compared with stored sets of optical reference values for various denominations to obtain error figures for each denomination and combination of position and amplitude shifting tested. A second indication of the denomination of the currency is generated on the basis of the least of the error figures obtained by this latter method and compared with the first indication. If the two indications of denomination correspond and the least error figures obtained by the two methods fall within predetermined limits, a credit signal is generated indicating a genuine bill of the indicated denomination.

U.S. Pat. No. 5,419,424

Inventor: Steven K. Harbaugh

Issued: May 30, 1995

A currency paper has a security thread embedded therein. The thread comprises a plastic substrate having a plurality of alphanumeric, metallic, electrically-conductive characters formed thereon. The characters have predetermined heights and widths and spacings therebetween. The verification device comprises an oscillator electrode and associated horizontal and vertical electrodes. A time-varying oscillator signal is coupled to the oscillator electrode. The spacing of the horizontal and vertical electrodes in relation to the oscillator electrode is determined by the spacing between the metallized characters on the thread. A valid security thread capacitively couples the oscillator signal into the horizontal electrode but not the vertical electrode. On the other hand, a counterfeit security thread will couple the oscillator signal into both the horizontal and vertical electrodes. Signal processing electronics is provided to sense these valid and counterfeit conditions.

U.S. Pat. No. 5,434,427

Inventor: Timothy T. Crane et al.

Issued: Jul. 18, 1995

A photodiode and a photo transistor are positioned on opposite sides of a document subjected to verification for authenticity under transmitted light. A logic circuit determines the presence or absence of the security feature and correspondingly provides visual or audible indication thereof. The photodiode, photo transistor and related circuitry are arranged with an enclosure that is attached to a currency receiving device such as a cash register. The visual or audible indicators are mounted on the cash register for immediate indication of the currency verification to the cashier. A simplified capacitive proximity sensor can be employed, per se, for inexpensive applications or for redundant verification in combination with an optical detector. The shape of the capacitive sensor is configured to that of the security thread to discriminate between the security thread and the currency paper. Additional optical circuits are employed to detect counterfeit markings on the currency surface.

U.S. Pat. No. 5,358,088

Inventor: Elwood E. Barnes et al.

Issued: Oct. 25, 1994

An apparatus and method for detecting magnetic data on media is disclosed which utilizes an array or arrays of horizontal magnetoresistive sensors. The present invention detects the pitch or separation of magnetic transition data on the magnetic medium under test, and generates a signal that is independent of the velocity of the medium. In one embodiment, the magnetoresistive sensors employed in an array are spaced apart a distance which corresponds to the separation of magnetic transition data of interest, and the output of each sensor is connected to a voltage adder. The signal from the voltage adder is at a maximum when the separation of the magnetic transition data corresponds to the sensor separation. A comparator is connected to the output of the voltage adder, and compares the voltage adder output to a predetermined threshold voltage before indicating that a medium having a particular magnetic transition data pattern is detected. Alternate embodiments contemplate connecting linear circuitry, digital circuitry, fuzzy logic or other electronic circuitry to the array of magnetoresistive sensors. An apparatus according to the present invention is accurate, requires a minimum of parts, is simple and inexpensive to manufacture, and may be employed in a currency validator, magnetic card reader or the like.

U.S. Pat. No. 5,468,971

Inventor: Steven Ebstein et al.

Issued: Nov. 21, 1995

A linear array of photo emitters and photo diodes are positioned on opposite sides of currency paper for denomination and verification determination under transmitted light. The photo emitters are arranged for projecting an image of the indicia printed on the security thread embedded within the currency paper. The photo diodes receive the image and connect with a processor circuit which determines the presence or absence of the security feature, reads the denomination indicia and correspondingly provides indication thereof. The processor contains stored information identifying currency denomination and a comparison is made at the time of verification to also determine the denomination of the proffered currency.

U.S. Pat. No. 5,535,871

Inventor: Steven K. Harbaugh

Issued: Jul. 16, 1996

A security thread for documents such as currency and banknote paper comprises a plastic substrate coated with a plurality of discrete metallic patterns of electrically-conductive material, such as aluminum. The metallic patterns are arranged on the surface of the thread to indicate the particular denomination of the currency paper. The thread is typically embedded entirely with the currency paper. A first embodiment of a verification device determines the authenticity and denomination of the currency paper by counting the number of conductive metallic patterns on the thread and comparing the count to various count ranges. A second embodiment of the verification device scans the thread in a narrow-edge direction such that it simultaneously encounters all of the conductive thread segments. Capacitive coupling of an oscillator signal into one or more sensing pads result in an electrical signal having a distinct pattern. This signal is compared to a plurality of signals stored in memory that are indicative of valid thread denominations.

U.S. Pat. No. 5,761,089

Inventor: George P. McInerny

Issued: Jun. 2, 1998

A document processing apparatus incorporates a counterfeit detection system for identifying counterfeit suspect documents on the basis of the magnetic characteristics of the documents. Each document is transported within the vicinity of a magnetic read head, which produces an electronic signal in response thereto. The signal from the read head is conditioned by a conditioning circuit to be compatible with the analog-to-digital converter. The conditioning circuit includes one or more amplifiers, a filter, a rectifier, and an integrator. The conditioned signal from the integrator is provided to the analog-to-digital converter and is optionally limited to a compatible voltage level. As each document is detected a plurality of sample values are obtained by the analog-to-digital converter. The sample values are accumulated to produce one or more cumulative values representative of the document. The cumulative values are compared with one or more predetermined reference values associated with a genuine document in order to determine whether the detected document is counterfeit suspect document.

U.S. Pat. No. 5,810,146

Inventor: Steven K. Harbaugh

Issued: Sep. 22, 1998

A document verification device detects the presence of a metal security thread embedded in a document such as currency paper. The device includes a sensor pad arrangement and corresponding signal processing electronics. The arrangement includes a single central sensing pad flanked by an array of twenty-seven pairs of outer pads. Each pair of outer pads in the array is electrically connected together. Every pad is made of conductive material. The width dimension of each outer pad in the array is greater than the width of the security thread. Each outer pad in the array is preferably angled to improve the reliability of detection of the security thread. The electronics generates a square wave oscillator signal that is applied to the outer array pads in a pattern that includes two adjacent pairs of array pads having the positive voltage level portion of the square wave signal applied thereto, and the following two adjacent pairs of array pads having the negative voltage level portion of the square wave signal applied thereto. This pattern is sequenced in time over the entire array. The document to be verified is transported with respect to the sensor pad arrangement such that the wide edge of the document is the leading edge. As the thread passes over the array, the pattern is sequenced throughout the pads fast enough such that, at a point in time, the thread will bridge the central sensing pad with a pair of outer two pads first having the positive voltage level portion of the square wave signal applied thereto, and then later the thread will bridge the central sensing pad with the same pair of outer two pads now having the negative voltage level portion of the square wave signal applied thereto. Since the thread is metallic, it will capacitively couple the square wave signal into the central sensing pad. The electronics senses the signal coupled to the sensing pad and interprets a valid security thread as being present in the currency from certain characteristics of the sensed signal.

U.S. Pat. No. 5,892,239

Inventor: Mitsuhiro Nagase

Issued: Apr. 6, 1999

A bill or security discriminating apparatus includes at least one irradiating device for irradiating a surface of a bill or security at a predetermined angle with the surface thereof, at least one polarization separating device for receiving light reflected by the surface of the bill or security and separating the received light into P-polarized light and S-polarized light, at least one first light detector for photoelectrically detecting the P-polarized light separated by the at least one polarization separating device and generating an electrical signal in accordance with intensity of the detected light, at least one second light detector for photoelectrically detecting the S-polarized light separated by the at least one polarization separating device and generating an electrical signal in accordance with intensity of the detected light, and a discriminator for discriminating the bill or security in accordance with the intensity of the P-polarized light and S-polarized light based on the electrical signals input from the at least one first light detector and the at least one second light detector. According to the thus constituted bill or security discriminating apparatus, it is possible to discriminate bills or securities with high accuracy even if they are damaged or wrinkled.

While these currency verification and/or detection devices may be suitable for the purposes for which they were designed, they would not be as suitable for the purposes of the present invention, as hereinafter described.

SUMMARY OF THE PRESENT INVENTION

The present invention provides a multi-sensor device which generates a signal comprised of one or more electromagnetic waveforms, for example, near infrared, radar and/or microwaves that are transmitted against a first target material, such as a wall, whereupon said wave or portion thereof is reflected by a first surface and a second wave or portion of said first wave will penetrate the target material and be reflected in part by a second surface.

The multi-sensor module having one or more antenna and means for storing time differential, amplitude, and frequency of the returning waves as a signature waveform for a target material of a structure. Whereupon, the remainder of the structure can be scanned using the multi-sensor device searching for deviation from the signature waveform and having means for generating audio and/or visual signals for a predetermined variance from the signature waveform. Any deviation from the signature waveform would indicate an anomaly which will be compared to a database of known responses for a plurality of materials and electromagnetic waves and may result in the recording and addition to said database for future reference and/or may result in audio and/or visual indicators signaling a potential storage site for currency.

Further said device has a number of user selectable preprogrammed presets using areas of the electromagnetic spectrum having known responses to the target material.

In addition, the multi-sensor device further has means for generating a magnetic field whereby the multi-sensor device can be brought into close proximity of an anomaly to determine if the anomaly has the predetermined characteristics for a quantity of currency.

Still further the multi-sensor device has storage means for containing an updatable database of known responses, e.g. bx cable contained within a wood lath plaster wall, bx cable contained within a wood lath plaster wall having a lead based paint, bx cable contained within a wood framed wall covered by gypsum wallboard etc,. The incorporated database can be tailored to a specific type of construction, such as a wood frame structure or cinder block construction.

A primary object of the present invention is to provide a multi-sensor device that can be used to detect currency hidden in walls, floors and ceiling cavities.

Another object of the present invention is to provide a multi-sensor device which is portable.

Yet another object of the present invention is to provide a multi-sensor device that can generate a plurality of electromagnetic waves.

Still yet another object of the present invention is to provide a multi-sensor device having one or more antenna for transmitting and receiving an electromagnetic wave.

Another object of the present invention is to provide a multi-sensor device having means for storing the frequency, amplitude, and time differential between a first and second returning electromagnetic wave.

Yet another object of the present invention is to provide a multi-sensor device having a plurality of preset electromagnetic waveforms established using predetermined responses to the target material.

Still yet another object of the present invention is to provide a multi-sensor device having means for indicating an aberration between a stored wave reception time differential and a current reception time differential.

Another object of the present invention is to provide a multi-sensor device having means for storing magnetic sample values for currency.

Yet another object of the present invention is to provide a multi-sensor device having a magnetic detector.

Still yet object of the present invention is to provide a multi-sensor device having means for generating a magnetic field.

Another object of the present invention is to provide a multi-sensor device having electrically conductive transmit and receive coils.

Yet another object of the present invention is to provide a multi-sensor device having electronic circuitry for recording and processing disturbances within the transmit coils magnetic field which generates a signal within the receiving coil.

Still yet object of the present invention is to provide a multi-sensor device having electronic circuitry for analyzing characteristic of the disturbance to determine if target characteristics are within stored currency parameters.

Additional objects of the present invention will appear as the description proceeds.

The present invention overcomes the shortcomings of the prior art devices by providing a multi-sensor device that can be used to scan target structures in a timely fashion to determine if there exists quantities of currency secreted within walls, floors, and/or ceilings.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED IN THE DRAWINGS 10 multi-sensor device
12 operator
14 first electromagnetic waveform transmitted
16 first electromagnetic waveform received
18 second electromagnetic waveform transmitted
20 second electromagnetic waveform received
22 first coil
24 second coil
26 magnetic signal
28 currency
30 first target surface
32 second target surface
34 meter
36 on/off switch
38 meter display
40 presets selector switch
42 operational selector switch
44 mode selector switch
46 MHZ selector switch
48 handle
50 display
52 antenna
54 power supply
56 coils
58 signal generator
60 signal processor
62 comparator
64 microprocessor
66 alarm
68 database
70 select structure to search
72 turn power on
74 initiate auto select
76 preset selection
78 test frequency selection
80 frequency valid
82 scan mode
84 scan surface
86 anomaly variation
88 conditional alarm indicator
90 magnetic detector
92 magnetic field anomaly scanned
94 magnetic field anomaly
96 magnetic field variance determination
98 conditional indicator response
100 currency detection indicator

BRIEF DESCRIPTION OF THE DRAWING FIGURES

In order that the invention may be more fully understood, it will now be described, by way of example, with reference to the accompanying drawing in which:

FIG. 1 is an illustrative view of the present invention in use. Shown is the device being used to ascertain a signature waveform for a target structure.

FIG. 2—is an illustrative view of the present invention in use. Shown is the multi-sensor device being used to scan a a structure after establishment of a signature waveform.

DETAILED DESCRIPTION OF THE PREFERRED EMBODIMENT

Figure 1:
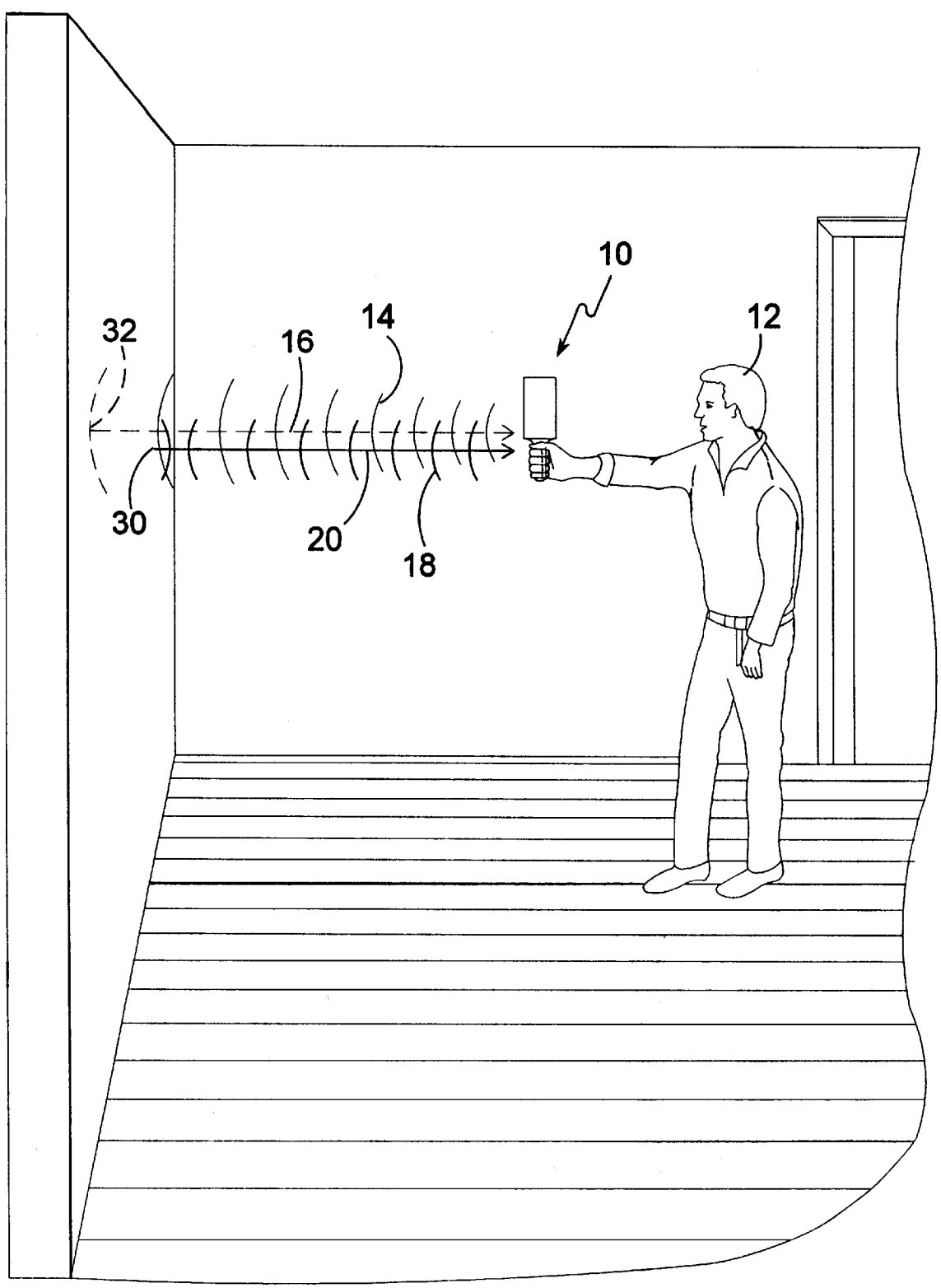

Turning now descriptively to the drawings in which similar reference characters denote similar elements throughout the drawing figures. FIG. 1 through FIG. 8 illustrate the Internet accessible computer based licensed broker/auctioneer management system of the present invention indicated generally by the numeral 10.

Referring to FIG. 1 the user (12) of the multi-sensor device (10) is establishing a signature waveform for a wall (30) by generating an electromagnetic wave (14,18) using one of the presets or a user generated electromagnetic wave.

As the user will be continuously moving around the room and the distance from the surface being scanned will be continuously changing, the first returning wave (20) will be used as a marker or origin point of the structure being scanned. The second returning wave (16) which has penetrated the wall will have the first wave (20) time subtracted which will provide a time differential herein referred to as the signature wave. Once the signature wave has been determined the rest of the wall (30) can be scanned.

Figure 2:
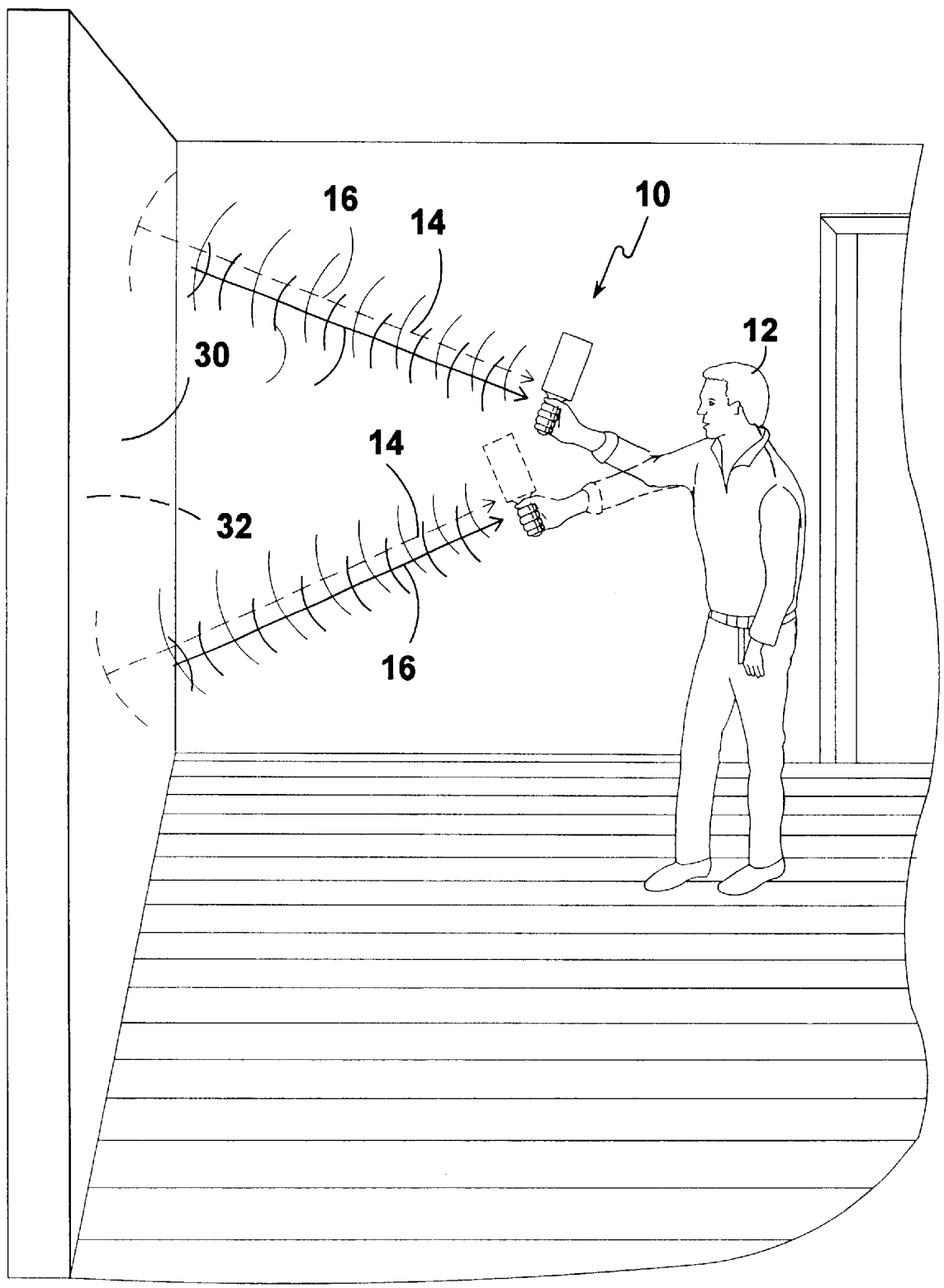

Referring to FIG. 2. The multi-sensor device (10) is being used to scan a wall (30) surface. The time differential of the selected frequency is compared to the signature wave form. If an aberration is detected the user can determine the size of the aberration by continuing to scan the area. This will eliminate false signals which can be generated by studs and pipes in walls, which for the most part will be eliminated by comparison to stored known values in the database (68). If the aberration is consistent over a contiguous area, then the area can be additionally scanned using the magnetic detector module of the multi-sensor device by moving the mode selector switch (44) magnetic.

Figure 3:
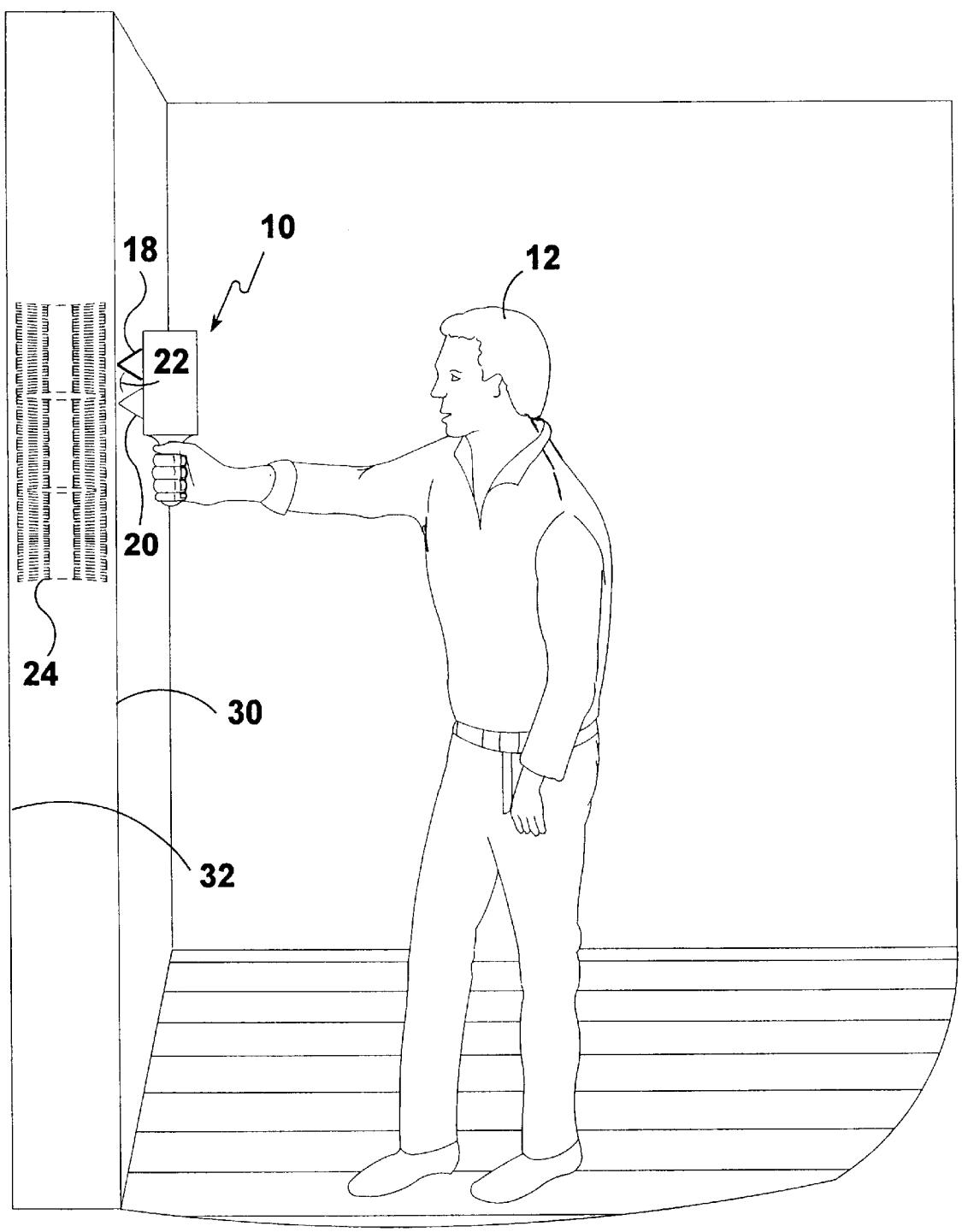
FIG. 3 is an illustrative view of the present invention in use. Shown is the multi-sensor device being used in the magnetic scanning mode.

Referring to FIG. 3, the user (12) is scanning the wall (30) with the multi-sensor device (10) set for magnetic scanning. The user (12) having determined that an anomaly within the wall (30) exists, can activate the magnetic detector circuitry of the multi-sensor device (10). A first magnetic coil (22) will create a magnetic field. As the device is passed over the anomaly any object having a magnetic signature will cause the second magnetic coil (24) to generate a signal which will be recorded and compared to a stored signature pattern within the database (68) for currency. If the signals are equal an audible and/or visual alarm (66) will notify the user that currency has been detected.

Figure 4:
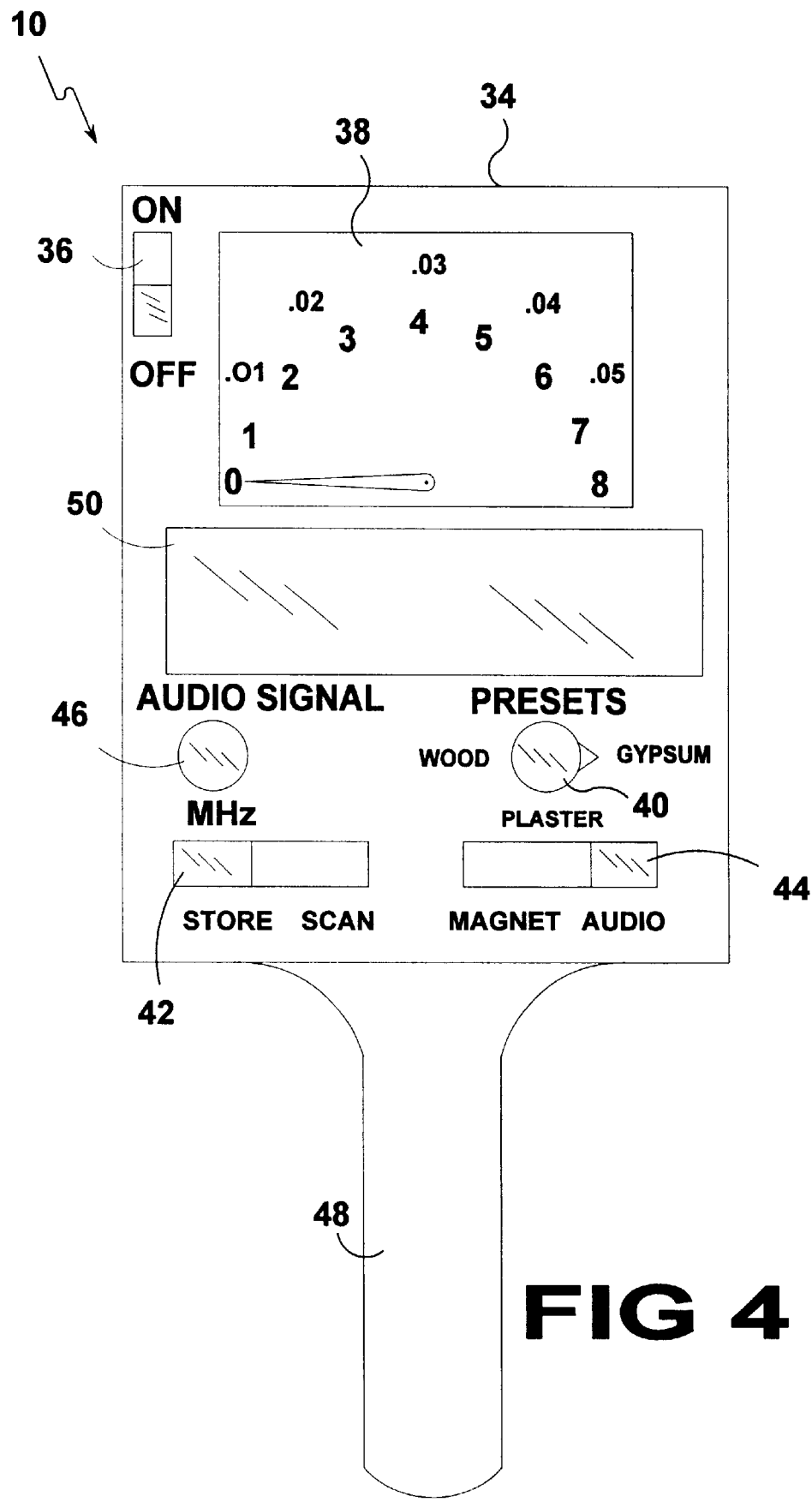
FIG. 4 is a front view of the multi-sensor device of the present invention.

Referring to FIG. 4, the portable multi-sensor device (10) having an on/off switch (36) for energizing the device using an internal power source (54), not shown. The device has a switch (42) for engaging a recording session which will determine the signature wave for the structure. The signature wave can be generated by the user using the audio signal (46) control knob. The device will continuously store the results as long as the selector switch (42) is set to store. Further the user can select one of a plurality of preset (40) frequencies which have been stored knowing the response of the target material. The device also has a meter (38) which will indicate a chosen frequency and a display window (50) which will enable the user to determine if the selected frequency properties are suitable for the target material. Suitability is determined by the multi-sensor device (10) being able to detect a first returning wave (16) and a second penetrating returning wave (20). Further the device has a selector switch (44) for selecting an audio scanning mode which is used to determine the size of the plenum area within the wall (30, 32) and to indicate when that area has object contained therein, or a magnetic detector mode which will generate a localized magnetic field (22) which will identify the presence of magnetic objects which will be compared to stored known characteristics for currency.

Figure 5:
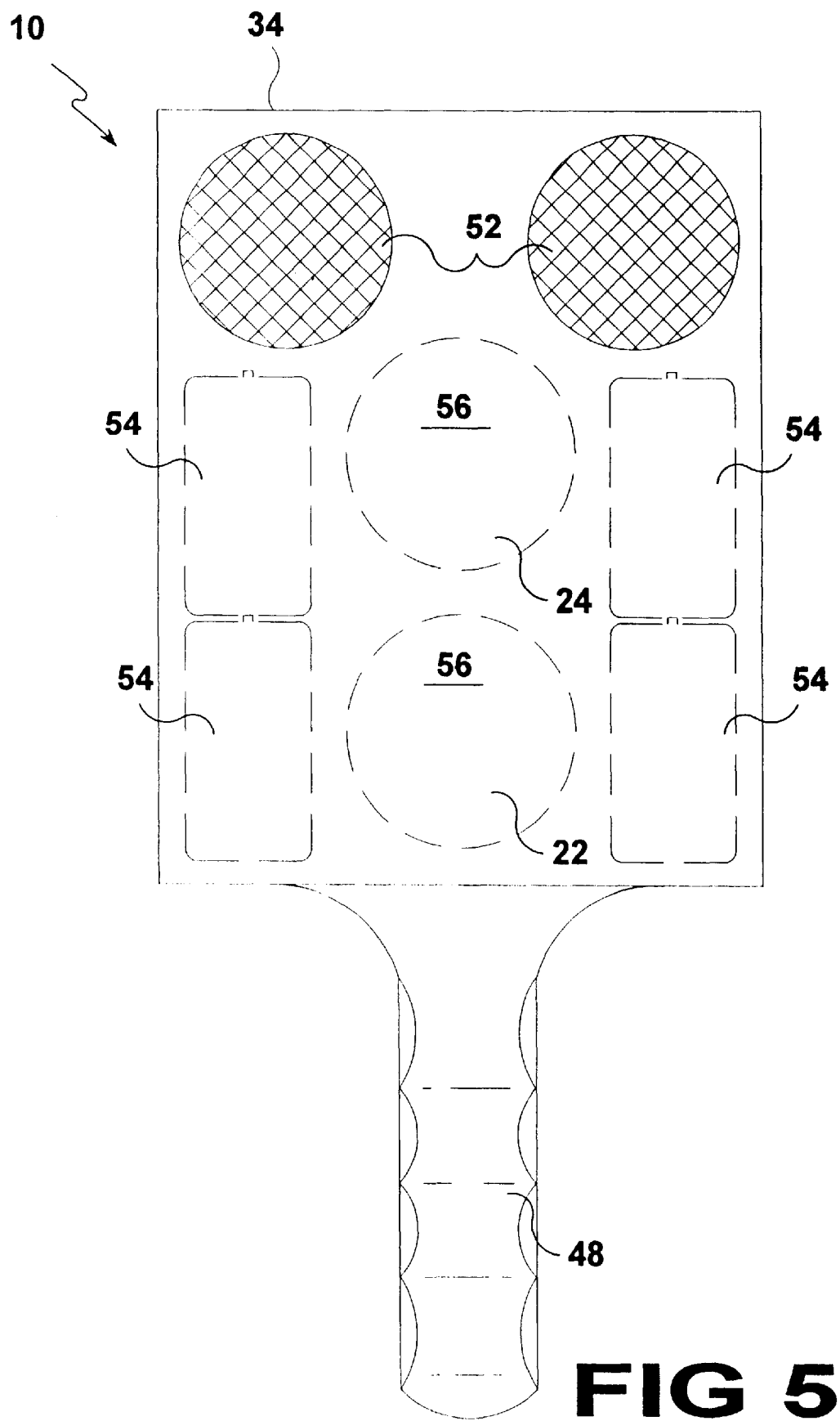
FIG. 5 is a rear view of the present invention.

Referring to FIG. 5, the antenna (52) is used to transmit and/or receive the specified electromagnetic waves. The magnetic coils (56) are used to generate a magnetic field by a first coil (22) and a second coil (24) which will register any disturbance within the first magnetic coil (22) caused by material having a magnetic signature passing within the first magnetic coils field.

Additionally shown, in outline are a plurality of batteries (54) which are used to power the device.

Figure 6:
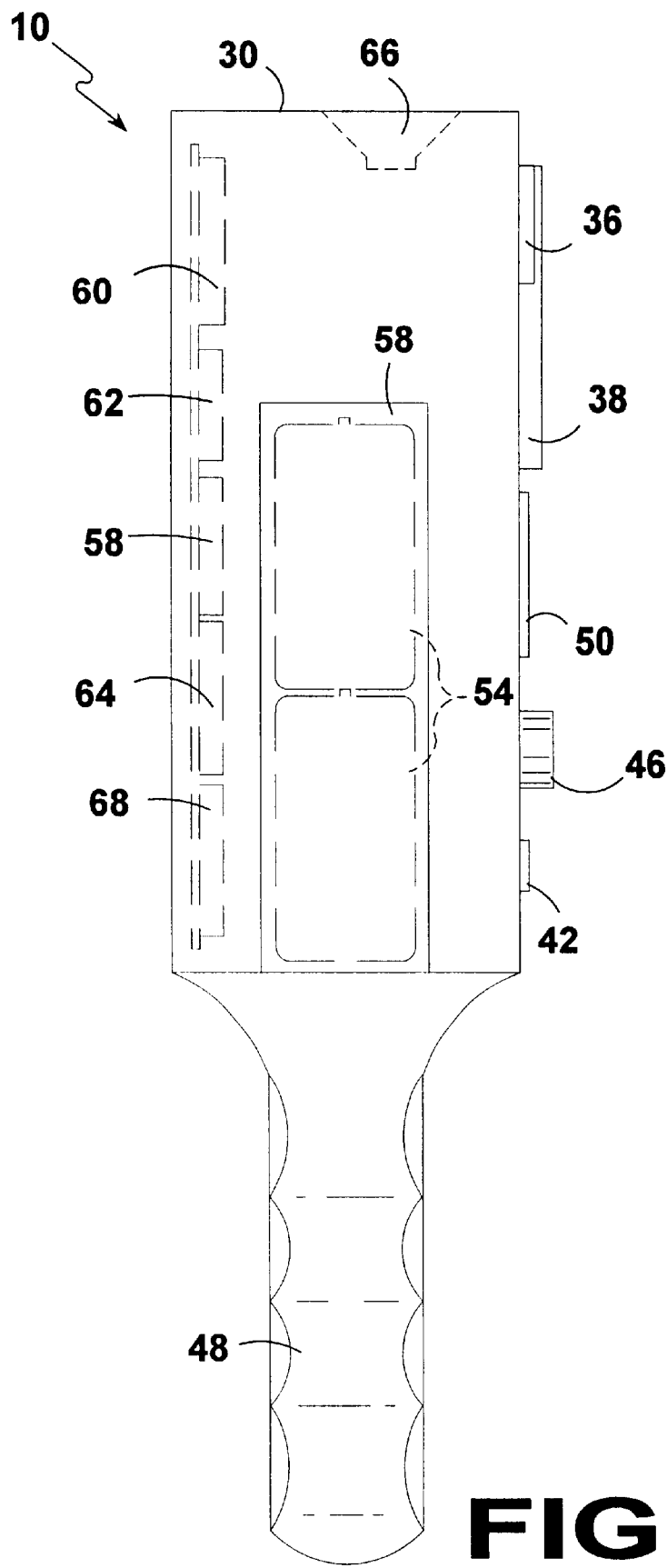
FIG. 6 is a side view of the present invention.

Referring to FIG. 6, and to FIG. 4 as well, the front control knobs and switches (42, 44) used to select the mode of operation as well to select certain user definable variables of the multi-sensor device. The plurality of batteries (54) has an access panel (58) providing means for selectively replacing said power source (54). There is also another access panel on the other side of the device, not shown, which also has a plurality of batteries (54) therein. The size of the power supply will enable the device to be used in the field for extended periods of time.

Figure 7:
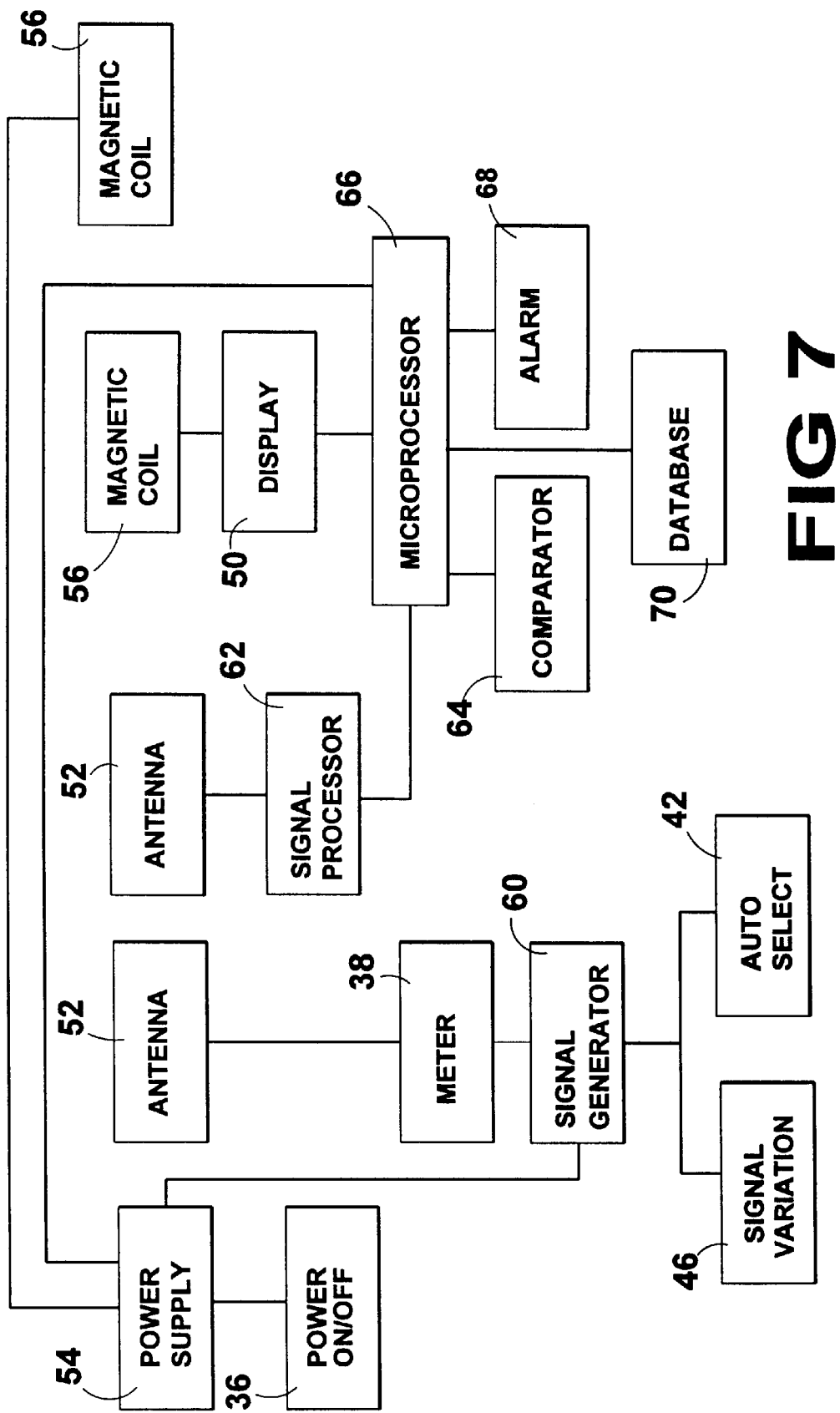
FIG. 7 is a block diagram of the components of the present invention.

Referring to FIG. 7, the multi-sensor device (10) is engaged by selecting power on using the power selector switch (54), Once engaged the user will select either one of the presets or selectively generate electromagnetic waves until the desired effect has been achieved.

Figure 8:
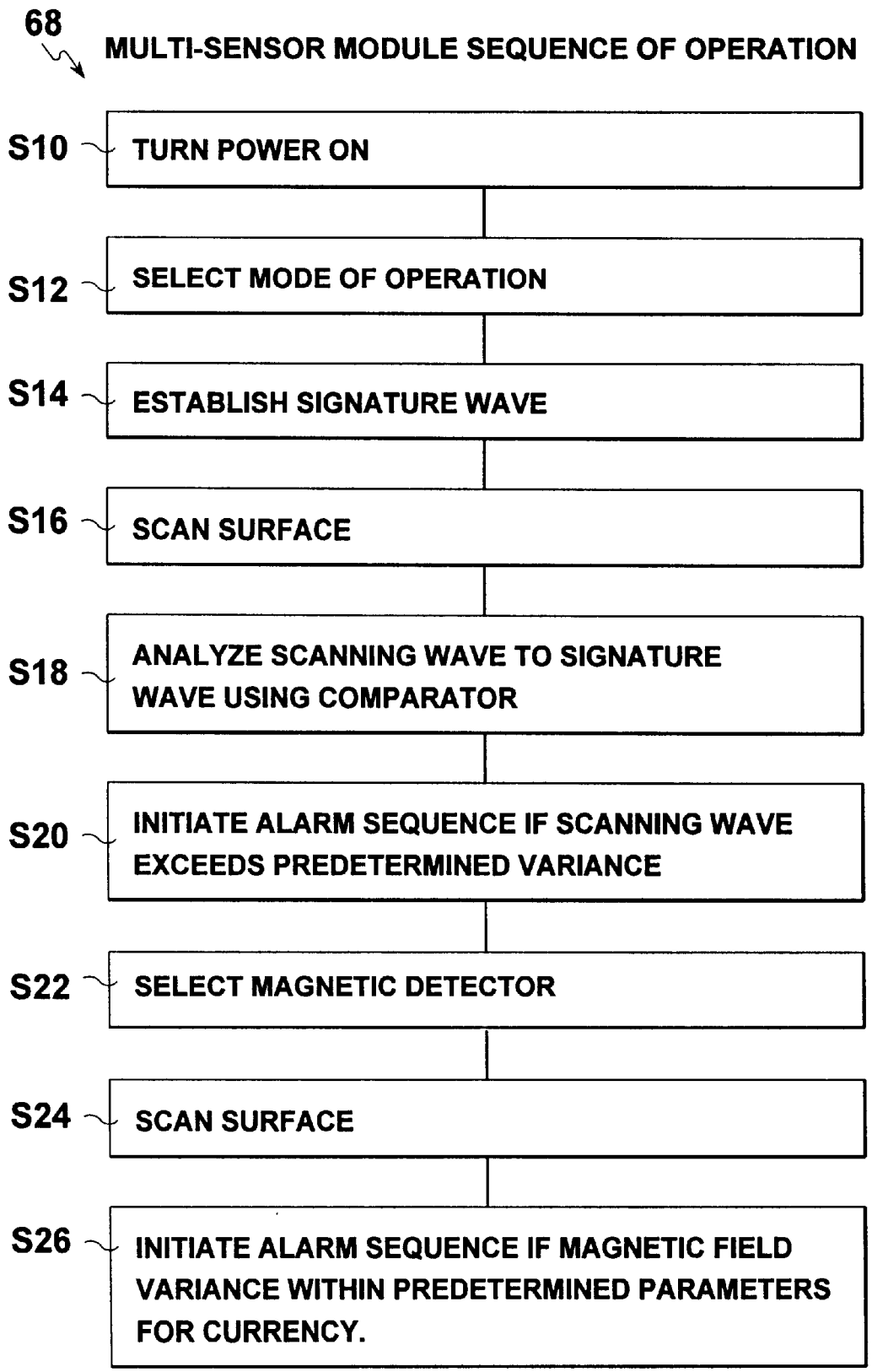
FIG. 8 is a flow chart of the present invention. Shown is the operational steps of the multi-sensor device during typical usage.

Referring to FIG. 8, describes the operational steps (S10–S26) whereby the user will selectively scan a structure.

Figure 9:
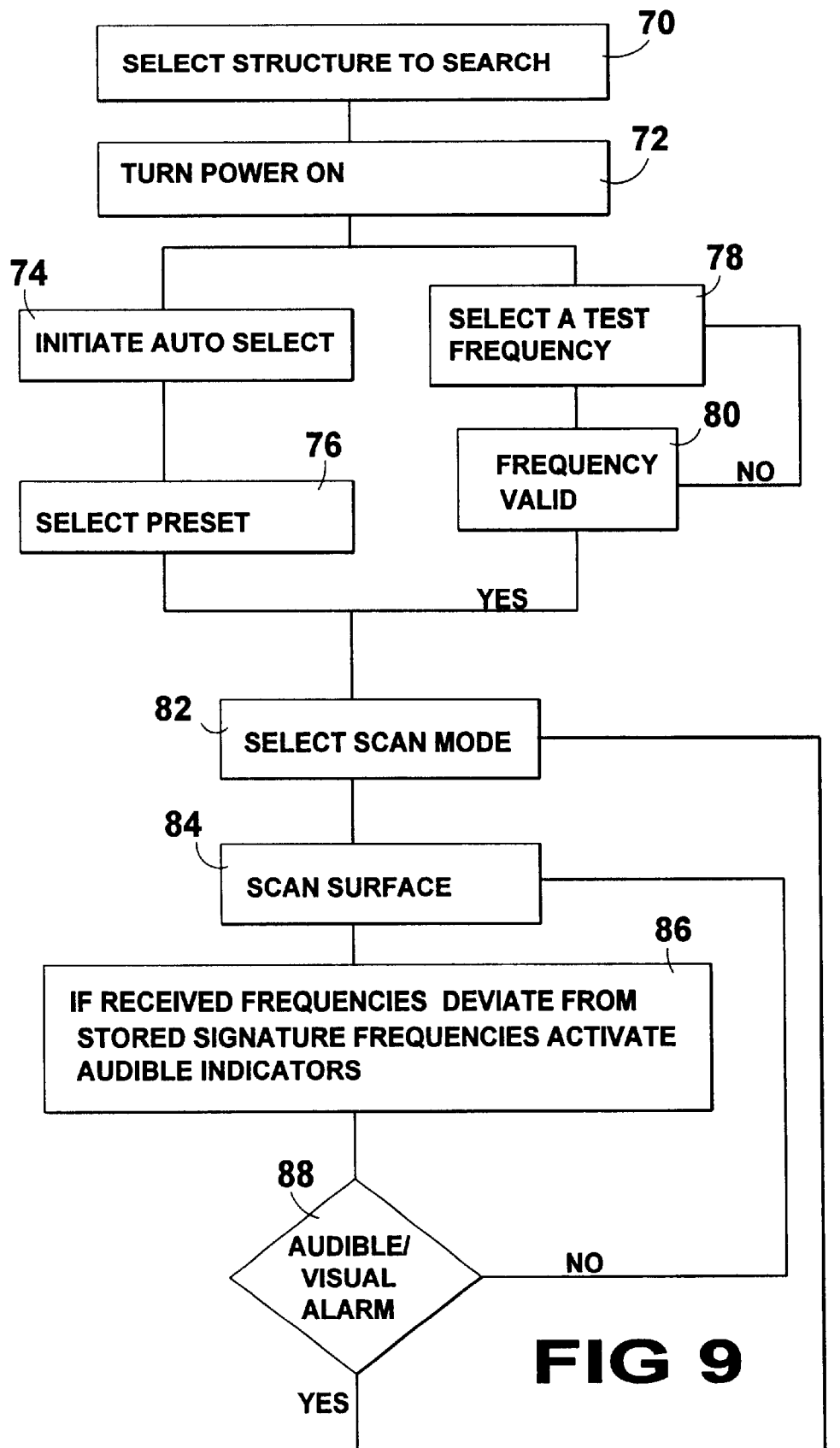
FIGS. 9 and 10 are diagrammatic flowcharts indicating the method of operation of the present invention in scanning a structure.
Figure 10:
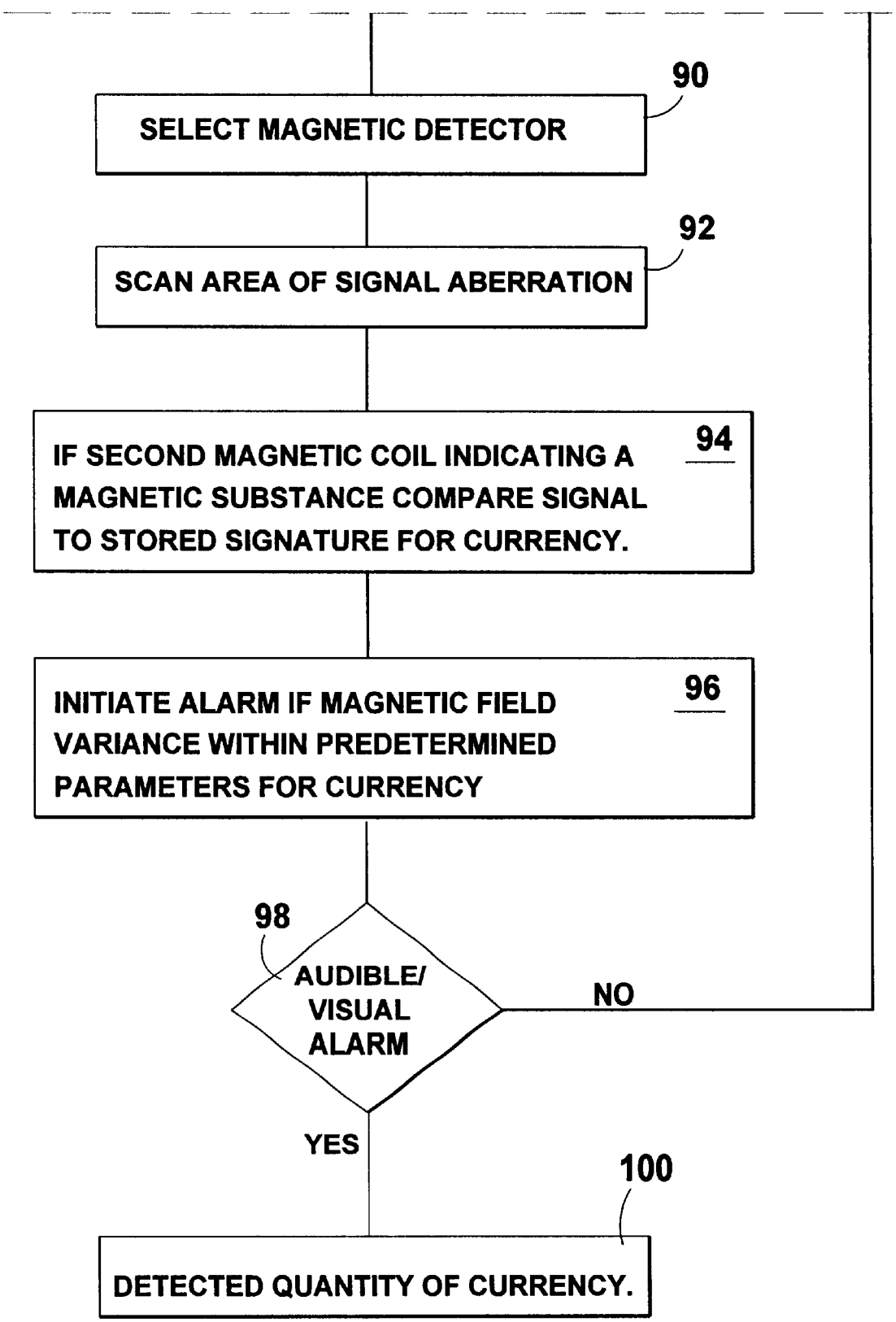

Referring to FIGS. 9 and 10, describes the operational steps which will determine during selective scanning of walls, floors, and ceilings.

What is claimed is new and desired to be protected by Letters Patent is set forth in the appended claims:

1. A multi-sensor device for scanning a target structure for hidden quantities of United States currency having:

a) means for generating electromagnetic waveforms and scanning said target structure with said waveforms;

b) means for receiving reflected electromagnetic waveforms from said target structure;

c) means for analyzing the directed and reflected electromagnetic waveforms to establish a signature wave for said target structure;

d) means for generating and directing electromagnetic waveforms at a specific region of said target structure;

e) means for receiving electromagnetic waveforms reflected from said specific region of said target structure and comparing with said signature wave to produce a variance; and f) means for initiating an alarm sequence if said variance exceeds a predetermined level indicating an aberration and a possible location of hidden currency.

2. The multi-sensor device of claim 1 having:
a) means comprising a first coil for creating a magnetic field and subjecting said suspect region of said target structure to said magnetic field when an alarm sequence is initiated indicating an aberration in said suspect region; and
b) means comprising a second coil for picking up the magnetic signature of said suspect region and comparing said magnetic signature with a stored signature.

3. A method for scanning a target structure for currency comprising the steps of:
a) selecting an electromagnetic scanning frequency;
b) selecting a surface on said target;
c) scanning said target surface with the selected frequency to obtain a signature wave for said target structure;
d) identifying aberrations within particular regions of the target surface from a comparison with said signature wave;
e) generating audio and visual indications for unidentifiable aberrations;
f) subjecting regions of said target surface with unidentifiable aberrations to a magnetic field;
g) sensing anomalies in said magnetic field; and
h) comparing said anomalies with a data base of anomalies for currency.

* * * * *